United States Patent [19]

Barney

[11] 4,027,315
[45] May 31, 1977

[54] MULTIPLE IMAGE CAMERA

[75] Inventor: Howard Hunter Barney, Los Altos Hills, Calif.

[73] Assignee: Dunn Instruments, Inc., San Francisco, Calif.

[22] Filed: Oct. 3, 1975

[21] Appl. No.: 619,450

[52] U.S. Cl. .............................. 354/76; 346/110 R; 354/123

[51] Int. Cl.² ......................................... G03B 29/00

[58] Field of Search .................. 354/6, 75, 76, 123, 354/120, 4, 81 L; 355/20, 53, 54; 346/110 R; 178/6.7 R, 7.4

[56] References Cited

UNITED STATES PATENTS

| | | | |
|---|---|---|---|
| 1,892,683 | 1/1933 | Robertson | 354/123 X |
| 2,984,537 | 5/1961 | Jarvis et al. | 346/110 R |
| 3,118,360 | 1/1964 | Marjoram et al. | 346/110 R |
| 3,458,253 | 7/1969 | Hansen | 354/6 X |
| 3,503,317 | 3/1970 | Johnson | 354/123 |
| 3,724,347 | 4/1973 | Gerber | 354/4 X |

*Primary Examiner*—John Gonzales
*Attorney, Agent, or Firm*—Schapp and Hatch

[57] ABSTRACT

Apparatus for receiving video output from a patient scanning device and photographing a plurality of video displays sequentially in multiple images onto a sheet of x-ray film. A video monitor adapted for connection to a scanning device, such as a gamma ray or ultrasonic imaging system, and having a display tube mounted in a housing in spaced relation to a wide angle lens formed to project the image of the face of the display tube onto a sheet of film supported in a film holder mounted on the housing. The positioning of the image on the film is determined by the vertical and lateral positioning of the lens relative to perpendicular X and Y axes corresponding to the length and width of the film. The lens is provided with a shutter for controlling the passage of light therethrough, and a pair of reversing electric motors are provided for selectively positioning the lens along the X and Y axes. Movement of the lens to the desired positions is controlled by light-emitting and light-sensitive pairs, such as a light-emitting diode and a photoelectric diode, connected to the drive motors for actuating and halting same in response to the passage or blocking of light therebetween.

30 Claims, 10 Drawing Figures

MULTIPLE IMAGE CAMERA

BRIEF SUMMARY OF THE INVENTION

This application relates to a MULTIPLE IMAGE CAMERA, and more particularly to apparatus for recording clinical video displays and the like in sequential order on sheet film.

Modern clinical examinations are often conducted with radiographic apparatus which produces electronic video signals capable of producing images of the body parts under examination on a video display tube or cathode ray tube. A typical example of such clinical imaging apparatus is the gamma ray imaging camera utilized to detect transient concentrations of radioactive chemicals injected or otherwise introduced into the body.

Because of the transitory nature of the images provided by video displays and the like, it is desirable to record the images displayed at specific times. Cameras have been provided to record the image on the display tube photographically at selected time intervals. Most of these cameras utilize self-developing prints or roll film upon which sequential images are imprinted seriatim. The self-developing prints, e.g., Polaroid, are comparatively expensive and must be mounted upon a backing member when it is desired to view juxtaposed images. Roll film images must also be cut and mounted in suitable filmstrip holders for such viewing.

It has been found that imprinting sequentially occurring images in predetermined juxtaposition on a comparatively large sheet of film provides several advantages. Most hospitals and clinics utilizing equipment of the type described are also equipped with 8 ×10 inch x-ray film and automatic sheet film processors. Images of the display tube can be printed in a grid of, for example, three images by three images in an image size large enough to provide good detail and in positions facilitating cross comparisons. Readily available x-ray films provide wide latitude for recording grey scale images, and this provides an additional advantage over self-developing prints which have limited grey scale latitude. The large sheet film format is familiar to doctors, is easy to view, especially by groups, and is inexpensive and easy to store. Also, large x-ray sheet film is adapted for simple and convenient processing in automatic film processors, and copies of sheet film are easily reproduced by x-ray duplicating techniques.

It has been proposed to imprint multiple serial images on sheet film by modifying the circuitry of the video monitor to place sequential images at desired locations on the display tube, with an exposure being made for each image. However, as the number of images desired to be imprinted on the sheet of film increases, each image becomes smaller and occupies less area of the display tube face. As the images grow smaller, resolution and detail are lost because the resolving ability of the display tube is limited by the fixed number of raster lines (typically 525 lines) inter alia on the entire tube face.

The multiple image camera of the present invention overcomes the described disadvantages of previous systems and provides juxtaposed images in a multiple format on a large sheet of film, with the images retaining substantially the maximum resolution of which the display tube is capable. To accomplish this, a wide angle lens projects minified images of the images on the face of the display tube onto a sheet of film, seriatim, with the positioning of the successive images on the film being determined by the vertical and lateral positioning of the lens relative to perpendicular X and Y axes corresponding to the length and width of the film.

The entire unit, including the video monitor and the lens with its positioning means, is contained in a housing which has a film holder at one end adapted for easy access from outside. The lens is mounted for relative movement in a partition formed transversely of the housing, and light tight integrity of the portion of the housing between the lens and the film is maintained by sliding curtain and sliding plate light seals between the lens and the fixed portion of the housing.

A shutter controls the passage of light through the lens for projecting the momentary image on the display tube onto the film in accordance with the positioning of the lens. A pair of reversing electric motors selectively position the lens along the X and Y axes, and movement of the lens to the desired positions is controlled by light-emitting and light-sensitive pairs cooperating with elements having spaced light-transmitting areas separated by opaque areas, the light-emitting and light-sensitive pairs and their cooperative elements being mounted for relative movement in accordance with the movement of the lens relative to the housing.

A remote control switch is provided to operate the shutter at the moment the operator desires to record the display tube image on the film, the lens then being automatically advanced to the next desired position ready for the next actuation of the shutter.

The unit is adapted for pedestal mounting, or for mounting on a wall bracket, and controls are provided for adjusting video brightness and contrast and for adjusting shutter speed. Visual inspection of the video display tube face is provided by a viewport which shields unwanted outside light from the display tube and controls are provided for adjusting contrast brightness and shutter speed. Patient and clinical data may be recorded photographically on the margin of the film by a separate light source and lens system.

It is therefore a principal object of the present invention to provide an apparatus capable of recording images from a video display tube or the like photographically on a large sheet of film in multiple, juxtaposed format.

Another object of the present invention is to provide an apparatus of the character described in which the video monitor image may be recorded photographically at any desired moment during the patient-examining procedure and from any desired location of the operator relative to the patient and the apparatus.

A further object of the present invention is to provide an apparatus of the character described in which operation of the shutter for photographically recording the image on the display tube face automatically initiates movement of the lens to the next predetermined position.

Another object of the invention is to provide an apparatus of the character described in which multiple images are projected sequentially in rows and columns onto a sheet of film, with the position of each image being determined by the position of the lens at each exposure.

A still further object of the invention is to provide apparatus of the character set forth in which patient and clinical data may be easily and conveniently recorded photographically on a desired portion of the sheet of film.

Further objects and features of advantage will become apparent as the specification progresses.

DESCRIPTION OF THE DRAWINGS

A preferred embodiment of the invention is shown in the accompanying drawings in which.

DESCRIPTION OF THE PREFERRED EMBODIMENT

Figure 1:
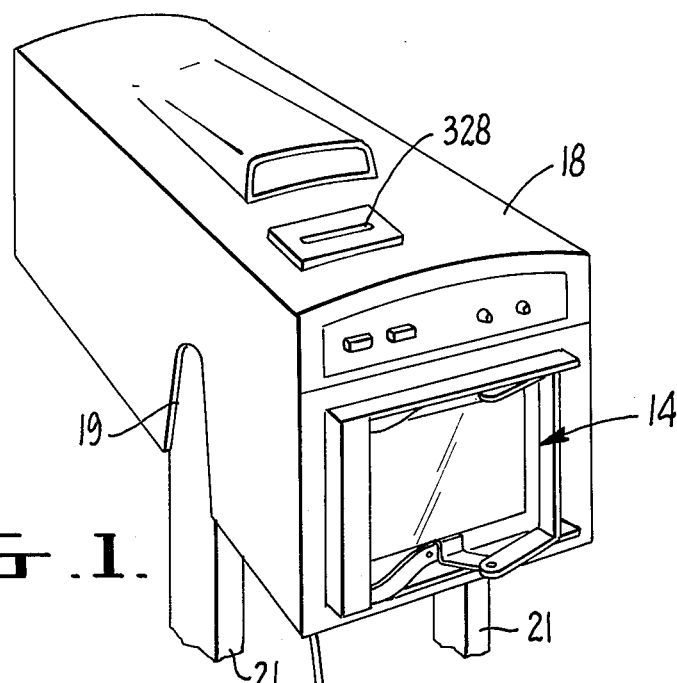
FIG. 1 is a prospective view of a multiple image camera constructed in accordance with the present invention.

Referring to the drawings in detail, it will be seen that the multiple image camera of the present invention basically includes a lens 11 adapted to receive light from a display tube 12, such as the picture tube of a video monitor 13, holder means 14 for holding a sheet of film 16 a spaced distance from the lens 11, and positioning means 17 for moving the lens 11 to a plurality of desired positions wherein the lens projects minified images of images on the screen of display tube 12 onto the film 16 in a plurality of corresponding locations or positions 16-1 through 16-9.

Figure 3:
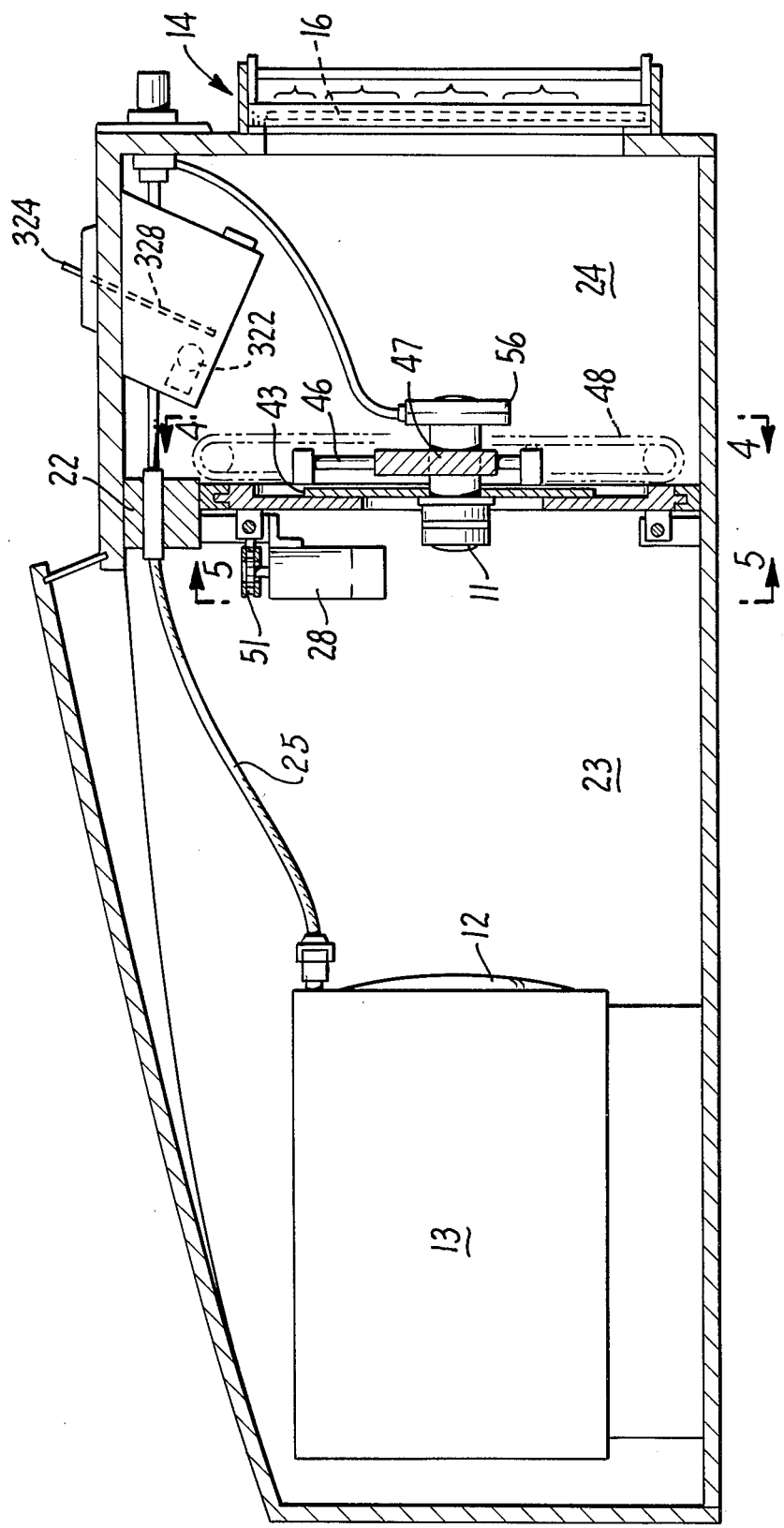
FIG. 3 is a vertical longitudinal cross-sectional view of the multiple image camera of FIG. 1.

The lens 11, video monitor 13 and positioning means 17 are enclosed in a housing 18 having a mounting bracket 19 for supporting the housing on a pedestal base 21 or a wall mount (not shown). Partition 22 (FIG. 3) divides the housing 18 into a chamber 23, containing the video monitor 13, and a light tight chamber 24; the lens 11 being supported by the partition 22. The brightness and contrast controls of video monitor 13 are coupled by means of flexible control shafts such as control shaft 25 of FIG. 3 to manually operable control means mounted on the exterior of housing 18 and thus accessible to the operator of the multiple image camera of the invention.

Figure 4:
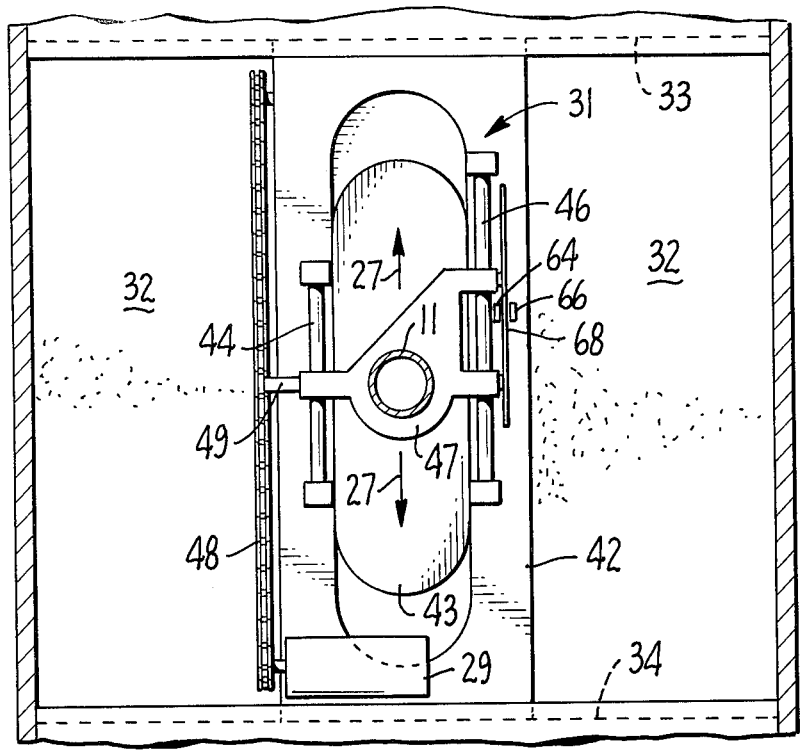
FIG. 4 is a vertical cross-sectional view on an enlarged scale taken substantially on the plane of line 4—4 of FIG. 3.
Figure 6:
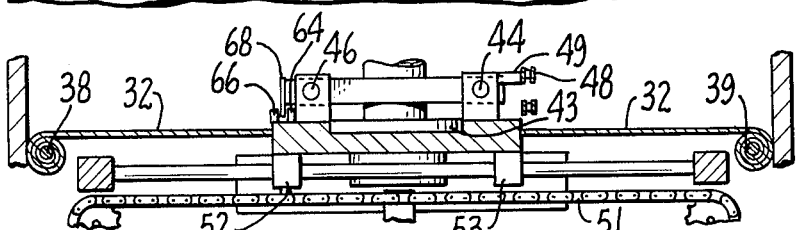
FIG. 6 is a fragmentary, horizontal sectional view taken substantially on the plane of line 6—6 of FIG. 5.
Figure 5:
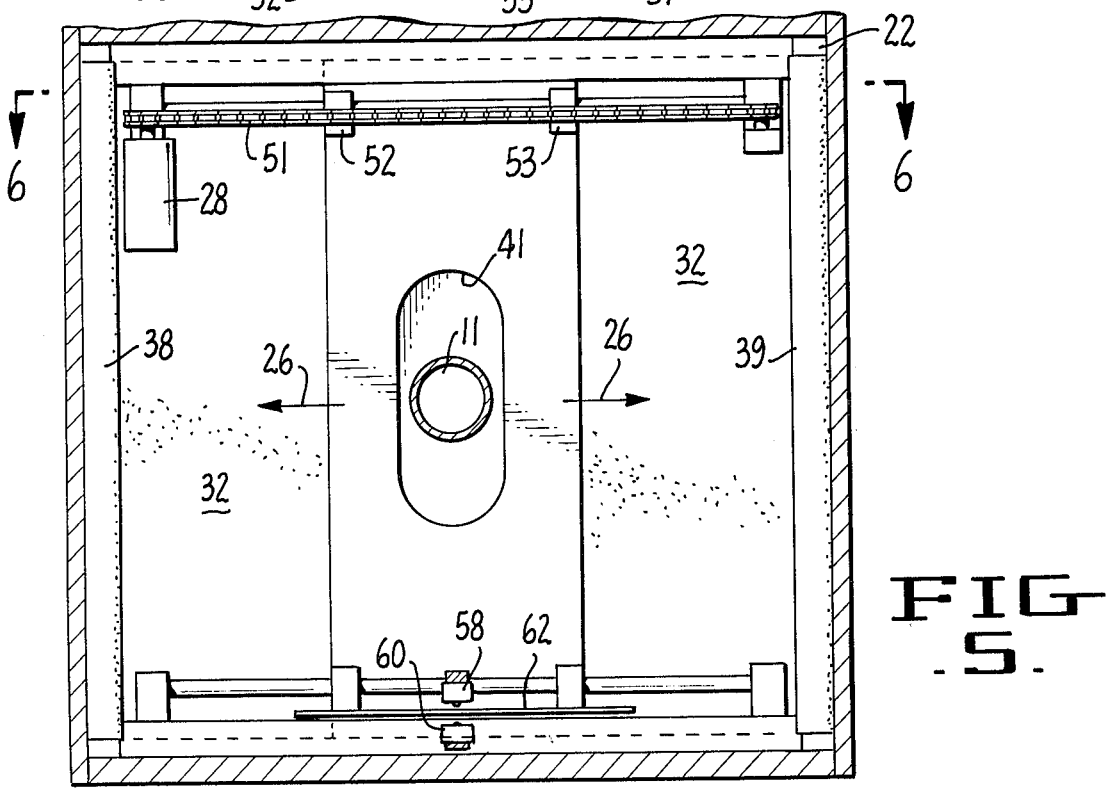
FIG. 5 is a vertical cross-sectional view on an enlarged scale taken substantially on the plane of line 5—5 of FIG. 3.

In accordance with the present invention, lens 11 is selectively movable in perpendicular X and Y directions, indicated by arrows 26 and 27 respectively in FIGS. 4 and 5. The lens moves incrementally in two directions, with the number of increments determining the grid coordinate positions of the lens and hence the positions of the resulting images on the sheet of film 16. As here shown, nine images are provided, with the longer dimension of the display tube 12 extending in the direction of the longer dimension of the film 16.

Positioning means 17 comprises first and second reversing drive motors 28 and 29 (FIG. 2) operatively connected to the lens 11 for movement of the latter in the X and Y directions respectively. Motors 28 and 29 may, for example, be 12 volt, direct current, permanent magnet field motors, such as those made by the Globe Industries Division of TRW, Inc., and identified by Part No. 317A116-4. Light tight integrity of chamber 24 is maintained during such movement of the lens 11 by mounting the lens on a plate assembly 31 (FIG. 4) carried for sliding movement in the direction of arrows 27 on a curtain slidable in partition 22 in the direction of the arrows 26.

Preferably and as here shown, the curtain 32 is semiflexible and is mounted for sliding movement in slots 33 and 34 formed in the partition 22. Because of its resistance to wear, opaque neoprene-impregnated fiberglass is a preferred material for constructing the curtain 32. The ends 36 and 37 of curtain 32 are conveniently curled around rollers 38 and 39 mounted at the ends of the curatin on partition 22, which are oppositely spring loaded to maintain curtain 32 under tension.

As here shown, the curtain 32 is cut out to provide an elongated opening 41 in which lens 11 is free to reciprocate in the direction of the arrows 27. Light tight integrity of curtain 32 is maintained by the plate assembly 31, which consists of a main plate 42 secured to curtain 32 in covering relation to the opening 41. A light seal plate 43 (FIG. 3) is secured to the lens 11, with the plate 43 being dimensioned to cover lens receiving opening 41 (FIG. 5) in all positions of the lens. Lens 11 is tracked for movement in the direction of arrows 27 by guide rods 44 and 46 secured in bosses extending from plate 42, lens 11 being mounted in a carriage member 47 slidable along the guide rods 44 and 46.

To effect the aforementioned movement of lens 11 in the direction of arrows 27, a pinion operated by drive motor 29 engages a drive chain loop 48 having a connection 49 to carriage member 47, motor 29 and drive chain 48 also being carried by plate 42. Movement of lens 11 in the direction of arrows 26 is accomplished by drive motor 28, which is supported on partition 22 and is operatively engaged with a drive chain loop 51 connected at 52 and 53 to plate 42.

Energizing of the motor 28 moves curtain 32 laterally to move lens 11 back and forth in the X direction. Similarly, energizing of motor 29 drives lens 11 up and down in the Y direction. The position of lens 11 with respect to the X axis and with respect to the Y axis determines the position on the film 16 of an image projected through the lens.

Figure 7:
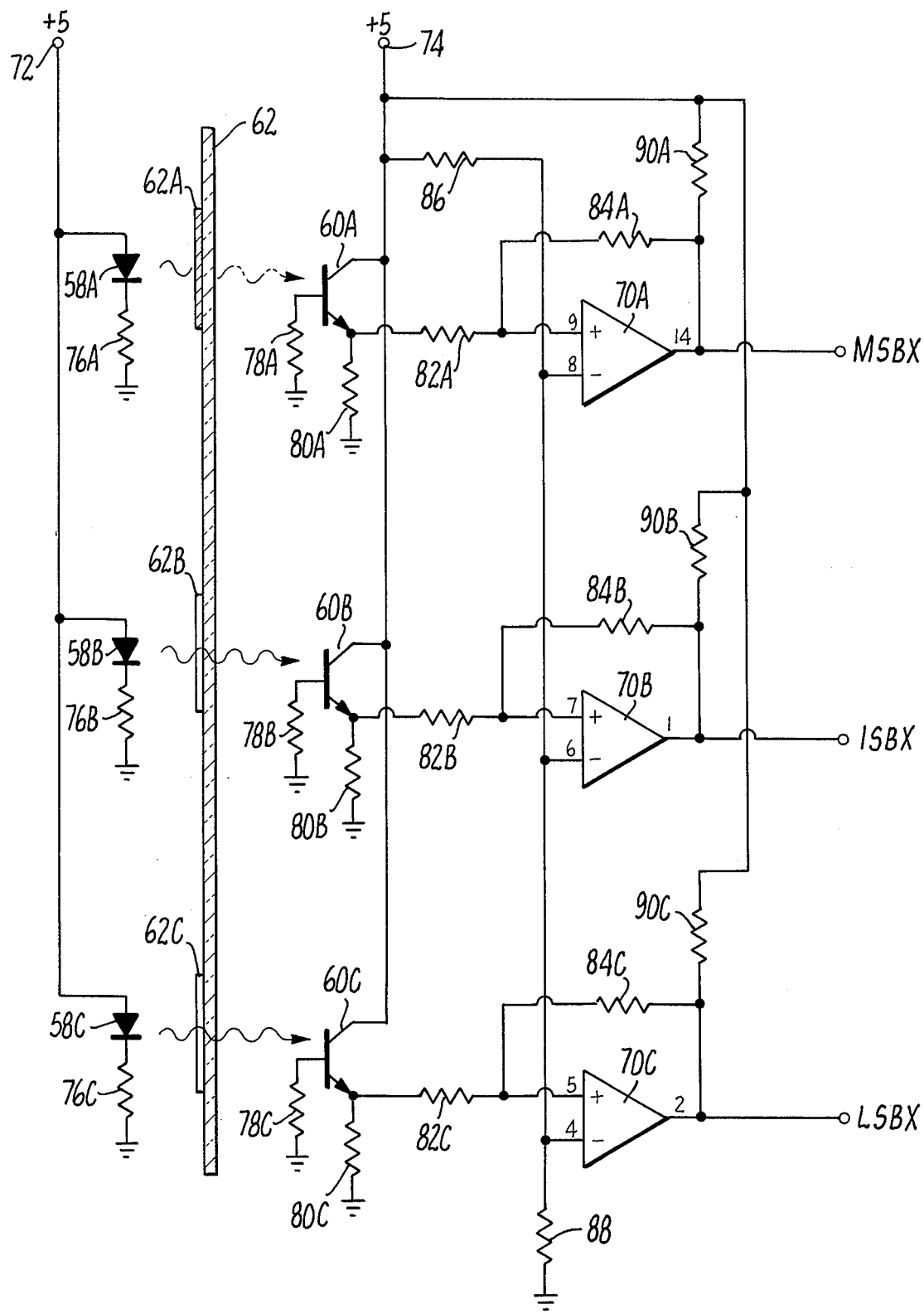
FIG. 7 is a schematic diagram of a carriage position encoder, two of which are utilized in the preferred embodiment of the present invention shown and described herein.
Figure 8:
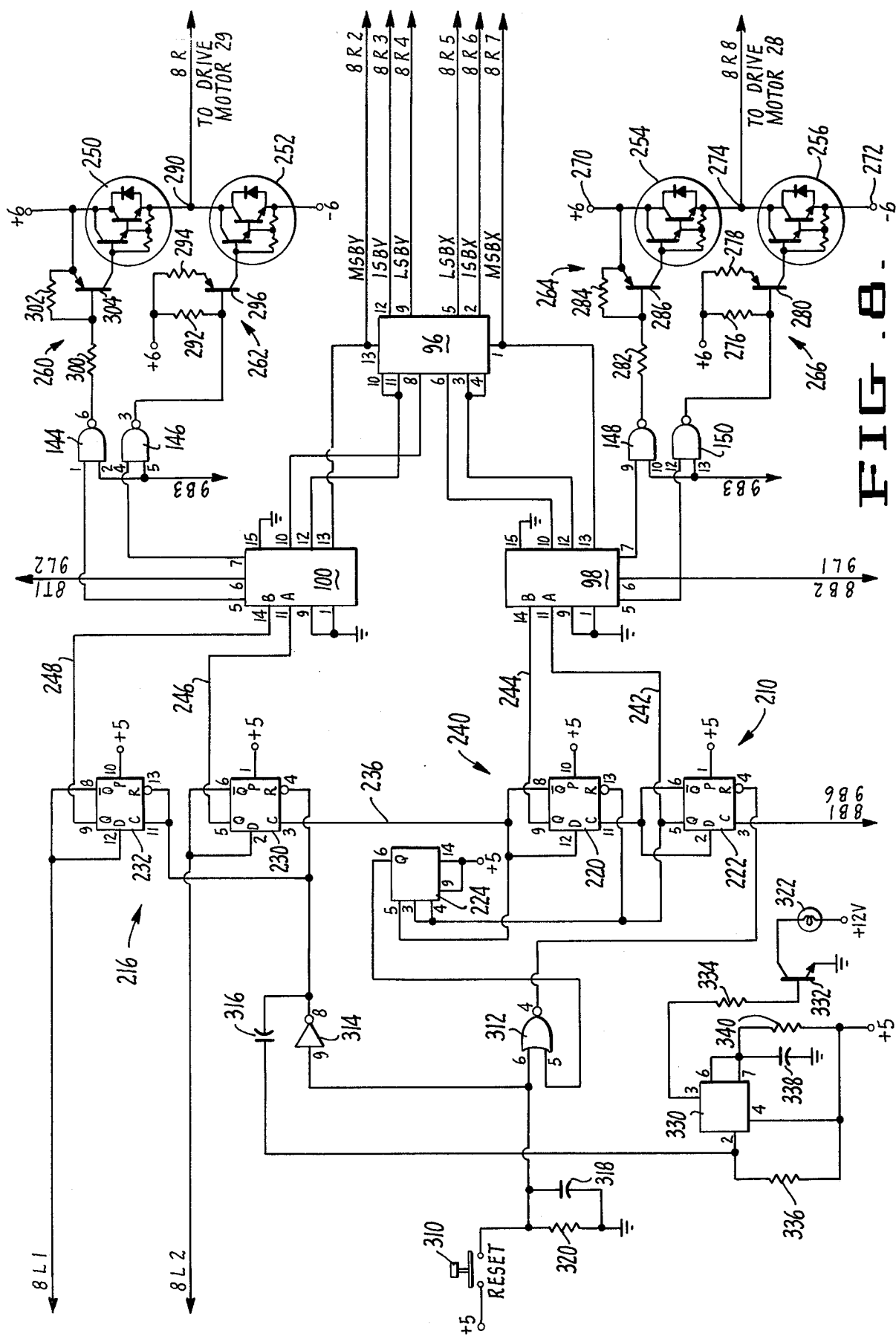
FIG. 8 is a schematic diagram of a part of the control circuit of the preferred embodiment of the present invention shown and described herein.
Figure 9:
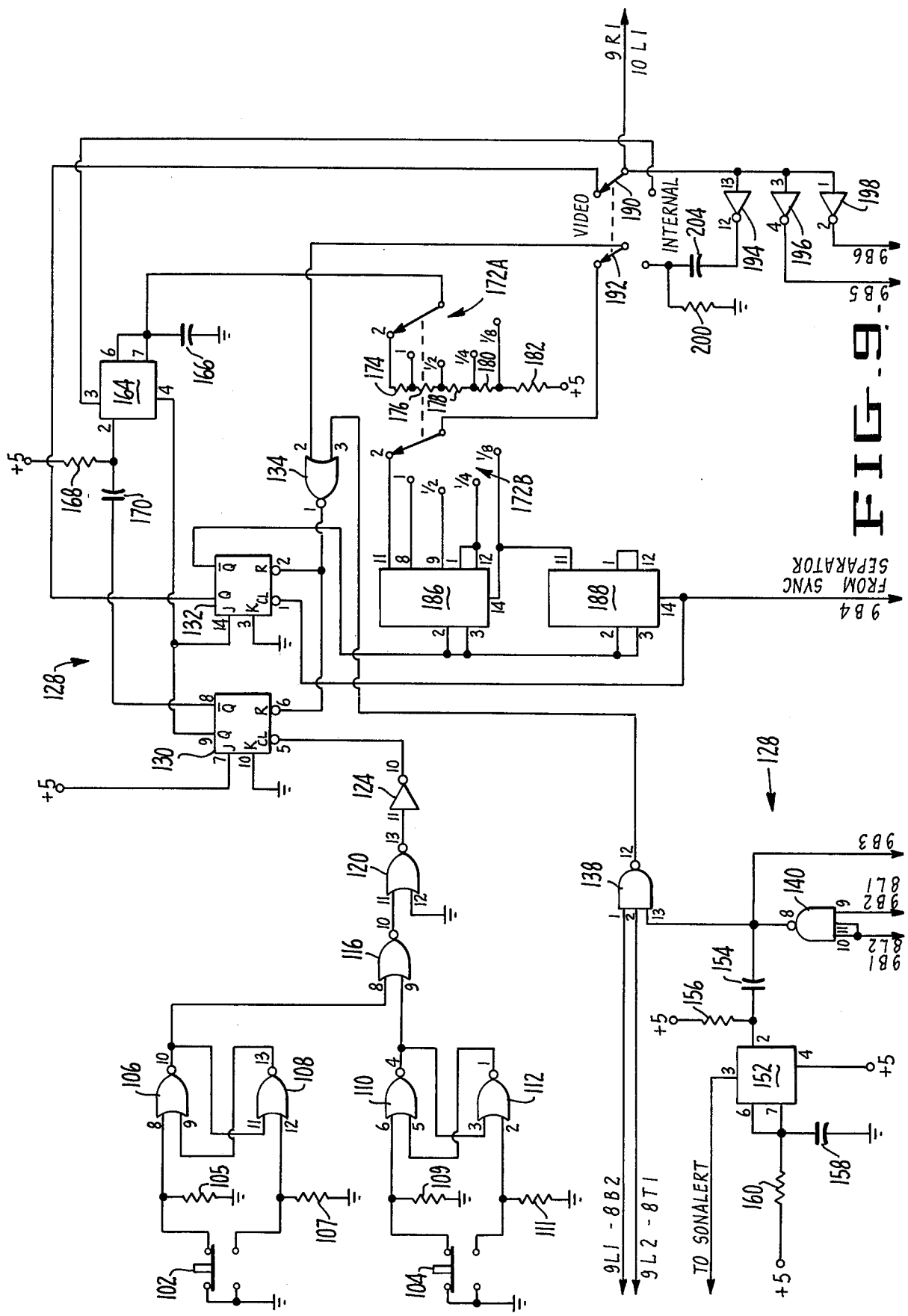
FIG. 9 is a schematic diagram of a part of the control circuit of the preferred embodiment of the present invention as shown and described herein.

Control means shown in FIGS. 7, 8, and 9 is provided for starting, stopping and reversing the electric motors 28 and 29 so as to selectively position the lens at locations corresponding to the desired positions of the images on the film 16. The control means is responsive to the position of the lens and to actuation of the shutter 56 (e.g., the Uniblitz Electronic Shutter, Model 225X2AOX5, made by Vincent Associates), to cause the lens 11 to move to the next preselected position after the shutter is actuated. To accomplish this, the control means feeds stop, start and reverse signals to the motors 28 and 29 when the shutter is tripped and in accordance with the programmed cycle of movement.

The control means used in the device of the preferred embodiment includes a set 58 (FIG. 5) of three light-emitting devices 58A, 58B, and 58C, such as light-emitting diodes (LED's); and further includes a set 60 (FIG. 5) of light-sensitive devices 60A, 60B, and 60C, such as phototransistors. When sets 58 and 60 (each set illustrated herein as a single unit) are mounted in cooperative juxtaposition as shown in FIG. 5, light-emitting device 58A is disposed opposite light-sensitive device 60A and cooperates therewith in the well known manner, illustrated in FIG. 7, i.e., light issuing from light-emitting device 58A falls on the sensitive portion of light-sensitive device 60A whenever a transparent portion of a Gray-coded mask 62 (FIGS. 5 and 7) is disposed therebetween. Whenever an opaque portion of said Gray-coded mask is disposed between device 58A and device 60A, no light from device 58A will inpinge upon device 60A. At the same time, i.e., when sets 58 and 60 are juxtaposed as shown in FIG. 5, light-emitting device 58B cooperates with light-sensitive device 60B in the manner just described in connection with devices 58A and 60A; and light-emitting device 58C cooperates with light-sensitive device 60C in the manner discussed above in connection with devices 58A and 60A. Also in the well known manner, Gray-coded mask 62 remains between set 58 and set 60 throughout its range of travel with lens 11, etc., and the light-emitting device-light-sensitive device pairs 58A/60A, 58B/60B, and 58C/60C cooperate with three separate bit tracks or bit patterns, respectively, which are, e.g., silk-screened or photoreproduced along the length of mask 62 in the well-known manner.

Thus, in the well-known manner, and with the aid of the circuit shown in FIG. 7, said pairs 58A/60A, 58B/60B, and 58C/60C cooperate with mask 62 to produce unique three-bit, Gray-coded or reflected-binary-coded signals uniquely corresponding to locations of carriage 47 and lens 11 in the X direction. For instance, one and only one of such signals corresponds to the positions of lens 11 in which it images the display on the face of tube 12 (FIG. 2) at locations 16-1, 16-4, and 16-7 on filmsheet 16 (FIG. 1); a different one, and only one, of such signals corresponds to the position of lens 11 in which it images the display on the face of tube 12 (FIG. 2) at locations 16-2, 16-5, and 16-8 on filmsheet 16 (FIG. 2); etc. A discussion of the same well-known principles as applied to shaft position encoders, rather than carriage position encoders, may be found at pages 207 and 208 of *Digital Counters and Computers* by Ed Bukstein, published by the Technical Division of Rhinehart and Company, Inc., New York, in 1960.

Referring to FIG. 4, and the above discussion of sets 58 and 60 and mask 62, it will be understood by those having ordinary skill in the art that light-emitting device set 64 and light-sensitive device set 66 cooperate with mask 68 as light-emitting device set 58 and light-sensitive device set 60 cooperate wih mask 62 (FIG. 5); a circuit of the kind shown and described hereinbelow in connection with FIG. 7 being provided to aid set 64 and set 66, along with mask 68, in providing unique Gray-coded signals corresponding to the vertical positioning of carriage 47 and lens 11.

Put differently, set 58 and set 60 cooperate with mask 62 (FIG. 5) and a circuit of the type shown in FIG. 7, to provide unique Gray-coded signals corresponding to the respective positions of lens 11 in the X or horizontal direction; while set 64 and set 66 cooperate with mask 68 (FIG. 4), and a second, independent circuit of the type shown in FIG. 7 to provide unique Gray-coded signals corresponding to the respective positions of lens 11 in the Y or vertical direction in the device of the preferred embodiment. To this end, sets 58 and 60 (FIG. 5) are affixed to housing 18 by suitable mounting means (not shown); while mask 62 is affixed to plate 42, directly or indirectly, for travel therewith by suitable means (not shown). Further, pairs 64 and 66 (FIG. 4) are affixed to plate 42 by suitable mounting means (not shown), and mask 68 is affixed to lens carriage 47 by suitable mounting means (not shown) for conjoint translation therewith.

It should be appreciated that similar control signals could be generated by lineal cams and limit switches mounted on the relatively movable parts. However, because of simplicity and reliability, it is preferred to utilize light-emitting and light-sensitive pairs such as light-emitting diode and a phototransistor.

Referring now to FIG. 7, there is shown the X-direction lens carriage position encoder of the multiple image camera of the preferred embodiment of the present invention.

Before describing this lens carriage position encoder in detail, it is pointed out that the Y-direction lens carriage position encoder of the multiple image camera of the preferred embodiment of the present invention differs from the X-direction lens carriage position encoder only in that it includes photosensing pairs 64 and 66 and Gray-coded mask 68, rather than the photosensing pairs 58 and 60 and the Gray-coded mask 62 shown in FIG. 7. Thus, the Y-direction lens carriage position encoder of the preferred embodiment of the present invention is not shown in the present drawings or separately described in detail in the present specification, for the reason that its construction and operation will easily be comprehended by those having ordinary skill in the art by studying the corresponding disclosure of the X-direction lens carriage position encoder shown in FIG. 7 and described in connection therewith.

Going now to the right-hand edge of the circuit, shown in FIG. 7, it will be seen that there are three vertically arrayed output leads marked LSBX, ISBX, and MSBX. The three-bit, Gray-coded, X-direction lens carriage position signals are produced on these three leads, one signal bit on each lead. Thus, the most significant bit signal of the three-bit X-direction lens carriage position signal set will be produced on the lead marked MSBX. Similarly, the least significant bit signal of the three-bit, X-direction lens carriage position signal set will be produced on the lead marked LSBX, and the intermediate significance bit of the X-direction lens carriage position signal set will be produced on the lead marked ISBX.

Correspondingly, the convention is adopted herein of identifying the lead carrying the most significant bit of the Y-direction lens carriage position signal set as MSBY; identifying the lead carrying the least significant bit of the Y-direction lens carriage position signal set as LSBY; etc.

Referring to FIG. 7, it will be seen that, as hereinabove described, Gray-coded mask 62 is so disposed that its most significant bit (MSB) track 62A is disposed between the most significant bit light-emitting diode (MSB/LED) 58A and the MSB phototransistor 60A. Similarly, in FIG. 7 the intermediate significance bit (ISB) track 62B of mask 62 is interposed between the ISB/LED 58B and the ISB phototransistor 60B; and the LSB track 62C of mask 62 is interposed between the LSB/LED 58C and LSB phototransistor 60C. As may be seen from inspection of FIG. 7, the elongated rectangle representing MSB track 62A is heavily shaded, whereas the elongated rectangles representing the ISB track 62B and the LSB track 62C are unshaded. This convention is adopted to remind the viewer of the present drawings that, in general, for each position of mask 62 (which in the schematic representation of FIG. 7 moves into and out of the drawing), the light path from one or more of the LED's will be blocked by an opaque portion of the corresponding bit track, while the remainder of such light paths will be unblocked because the corresponding portion of the bit track is transparent or non-existent. Taking a shaded bit track area as opaque or 1, and an unshaded bit track area as transparent or 0, it follows that when the mask 62 is positioned as indicated in FIG. 7 the MSBX signal will be in its 1 state, the ISBX signal will be in its 0 state, and the LSBX signal will be in its 0 state.

Reviewing FIG. 7 generally, then, it will be seen that it can be thought of as representing three-bit channels, each bit channel comprising an LED, portion of the corresponding bit track of mask 62, a phototransistor, an integrated circuit voltage comparator, e.g., 70A, and several other passive and supporting circuit elements, along with suitable power supply potentials. Points 72 and 74 are supplied with suitably regulated positive 5-volt direct current potential from a power supply adapted for operation in connection with integrated circuits of the well-known kind. In the circuit of FIG. 7 the LED's 58A, 58B, and 58C may generally be any light-emitting diodes of the well-known type. The phototransistors 60A, 60B, and 60C may all be phototransistors of the MT2 type, spectrally matching the LED's 58A, 58B, and 58C. The three integrated circuit voltage comparators 70A, 70B, and 70C may all be of the LM339 type.

Considering the passive elements of the circuit of FIG. 7, each of the LED current-limiting resistors 76A, 76B, and 76C may be a 100 ohm resistor of suitable wattage selected in accordance with the current rating of the associated LED, these resistors not being critical as to structural type, etc. The phototransistor base bias resistors 78A, 78B, and 78C may, for instance, be 1 megohm resistors of suitable wattage rating. The resistors 80A, 80B, and 80C may, for instance, have a resistance value of 2,000 ohms. The other resistors connected to the emitters of the phototransistors may, for instance, have the nominal resistance value of 10,000 ohms. The feedback resistors 84A, 84B, and 84C may have the nominal resistance value of 10 megohms. Bias resistor 86 may, typically, have the value of 20,000 ohms, while bias resistor 88 may, typically, have the resistance value of 1,000 ohms. Each of the bias resistors 90A, 90B, and 90C may, typically, be a 3,000 ohm resistor.

As will be evident to those having ordinary skill in the art as taught by the present disclosure, the circuit of FIG. 7 essentially comprises three independent bit channel circuits, A, B, and C, each of which operates in the well known way to detect transparency or opacity of the section of the corresponding bit track presented between the LED and the phototransistor at any particular time, and to amplify and stabilize the resulting logic level signal by means of a suitable operational amplifier circuit, thus presenting at the respective significant bit (SB) outputs, well regulated, stabilized, and standardized signals corresponding to the three reflected-binary digits represented by the portions of the three-bit tracks then interposed between the three LED's and phototransistors. In other words, for each X-direction position of lens 11 and lens carriage 47 (FIG. 4), within the limits of resolution of fineness of the data imprinted or photoreproduced on the bit tracks 62A, 62B, and 62C of mask 62, a corresponding unique set of output signals will be produced at the terminals MSBX, ISBX, and LSBX, the sequential progression of these signals as plate 42 is translated horizontally within housing 18 being in accordance with the well-known Gray code. A circuit substantially identical to that shown in FIG. 7 but independent thereof is provided to coact with mask 68 (FIG. 4), the LED's of the bit channels A, B, and C thereof being designated at 64A, 64B, and 64C, and being mounted in the unit 64 of FIG. 4, and the phototransistors of the bit channels A, B, and C thereof being designated as 66A, 66B, and 66C, and being mounted in the unit 66 in FIG. 4, the LED's 64A, 64B, and 64C, and the phototransistors 66A, 66B, and 66C all being so mounted as to be operatively juxtaposed to mask 68 in the same sense in which the LED's and phototransistors of FIG. 7 are operatively juxtaposed to mask 62, whereby a unique Gray-coded signal or set of signals is produced at the three output terminals of said substantially identical circuit, one such signal corresponding to each Y-direction position of lens carriage 47 and lens 11. The three output terminals of said substantially identical circuit, whereat are produced the three bit signals making up the Y-direction position signal set, are identified by notation analagous to that identifying the three corresponding output terminals of the circuit of FIG. 7, excepting that the Y-direction bit signal output terminal designators have Y as their last character, rather than X. Thus, the least significant bit signal output terminal of the circuit associated with Y-direction mask 68 (FIG. 4) is designated LSBY; while the corresponding most significant bit signal output terminal is designated MSBY. Similarly, the intermediate significance bit signal output terminal of the Y-direction carriage position encoder circuit, i.e., said substantially identicl circuit, is designated ISBY.

Referring now to FIG. 8 and particularly to the right-hand edge portion of the circuit shown therein, it will be seen that the above-described X-direction bit signals and Y-direction bit signals are applied to the terminals of integrated circuit 96. More particularly, the MSBX signal is applied to pin 1 of integrated circuit 96, the ISBX signal is applied to pin 2 of integrated circuit 96, etc., all as shown in FIG. 8. Integrated circuit 96 is an integrated circuit of the well known type identified by the trade-recognized reference numerals 7486, which provides four exclusive-OR gates in one package (see, for instance, the publication entitled *Digital Integrated Circuits*, published by the National Semiconductor Corporation of Santa Clara, California, 1973, pages 1-51 and 1-52).

Integrated circuit 96 is utilized as a dual Gray-Code-to-Binary-Code converter for converting the Gray-coded horizontal lens position information applied to pins 1, 2 and 5 thereof to the same information in pure binary code, appearing at pins 1, 3 and 4 (tied), and 6;

and for converting the Gray-coded vertical lens position information applied to pin 9, 12, and 13 of integrated circuit 96 into the same information in pure Binary Code, appearing at pins 13, 10 and 11 (tied), and 8 of integrated circuit 96.

Put differently, the X-coordinate of the actual lens carriage position at any time during the operation of the device of the preferred embodiment is expressed in three-place binary notation by the potentials at pins 1, 3 and 4 (tied), and 6 of integrated circuit 96; and the Y-coordinate of the actual lens carriage position at any time during the operation of the device of the preferred embodiment is expressed in three-place binary notation by the potentials at pins 13, 10 and 11 (tied), and 8 of integrated circuit 96. For this reason, the potentials on pins 1, 3 and 4, and 6 of integrated circuit 96 are collectively called the actual lens carriage position signal in the X-coordinate direction, or ACPX signal, herein, and the potentials on the pins 13, 10 and 11, and 8 of integrated circuit 96 are collectively called the actual lens carriage position signal in the Y-coodinate direction, or ACPY signal, herein.

Referring again to FIG. 8, it will be seen that the said ACPX signal, or signal set, is directly applied to pins 10, 12 and 13 of integrated circuit 98; and that the said ACPY signal, or signal set, is directly applied to pins 10, 12 and 13 of integrated circuit 100.

For reasons which will become apparent hereinafter integrated circuit 98 is called the X-comparator and integrated circuit 100 is called the Y-comparator.

In addition to the pair of actual carriage position signals or signal sets just described, i.e., ACPX and ACPY, there is also generated in the device of the preferred embodiment a pair of signals or signal sets which are called herein the new carriage position signals or signal sets, symbolized respectively by the designators NCPX and NCPY. Whenever lens 11 is so positioned as to image the display on screen 12 (FIG. 2) on a new, i.e., as yet unexposed, location, e.g., 16-4, on filmsheet 16 (FIG. 2), the binary value of ACPX is equal to the binary value of NCPX and the binary value of ACPY is equal to the binary value of NCPY. Immediately after said new location has been exposed, however, i.e., the display on screen 12 imaged thereupon by the action of lens 11 and the opening of shutter 56, the binary values of the signal sets NCPX and NCPY are automatically changed to the binary values corresponding to the next location to be exposed. For example, if the location or area 16-4 (FIG. 2) of filmsheet 16 has just been exposed, the NCPX and NCPY lens carriage position signal sets will immediately assume their binary values corresponding to the location 16-5, as hereinafter described. As also hereinafter described, the binary values of the ACPX and NCPX signal sets are constantly compared by the X-comparator 98, and the binary values of the ACPY and NCPY signal sets are constantly compared by the Y-comparator 100, so that changes in the NCPX and NCPY signal sets of the kind just described result in error signal outputs from the X and Y comparators 98 and 100, which error signals bring about the repositioning of lens 11 to be ready to image the display on screen 12 on the area or location of filmsheet 16 corresponding to the new binary values of the NCPX and NCPY signal sets, all as described hereinafter.

Exposure of each location or area of filmsheet 16 is initiated in the device of the preferred embodiment either by a manual exposure switch 102 (FIG. 1) or by a footswitch 104 (FIG. 1). For convenience, only the operation of the manual exposure switch 102 will be described herein, the operation of footswitch 104 being apparent to those having ordinary skill in the art who study the discussion of the operation of manual switch 102 found hereinbelow.

Going to FIG. 9, there is shown manual exposure switch 102 and its associated debouncing network, comprising principally two NOR gates 106 and 108 of a 7402-type integrated circuit, the other NOR gates of this 7402-type integrated circuit being used in the same manner in connection with footswitch 104. The resistors 105, 107, 109, and 111 connected between pins 8, 12, 6, and 2 of this integrated circuit and ground may typically be 270 ohm resistors. The function of the two debouncing networks comprising NOR gates 106, 108, 110, and 112 is to eliminate the effects otherwise produced by the mechanical bouncing of the contacts of the associated switches 102, 104, in the well-known manner.

Referring again to FIG. 9, it will be seen that the output signals from both the manual exposure switch debouncing network and the foot exposure switch debouncing network, respectively, are applied to the input pins 8 and 9 of NOR gate 116. NOR gate 116, in the preferred embodiment of the present invention, is one of the NOR gates of a type-7402 integrated circuit. As also seen in FIG. 9, the output signal from NOR gate 116 is applied to a signal-conditioning network comprising NOR gate 120 and inverter 124. In the preferred embodiment NOR gate 120 is one of the NOR gates of a 7402-type integrated circuit, and inverter 124 is one of the inverters of a 7404-type integrated circuit.

Figure 10:
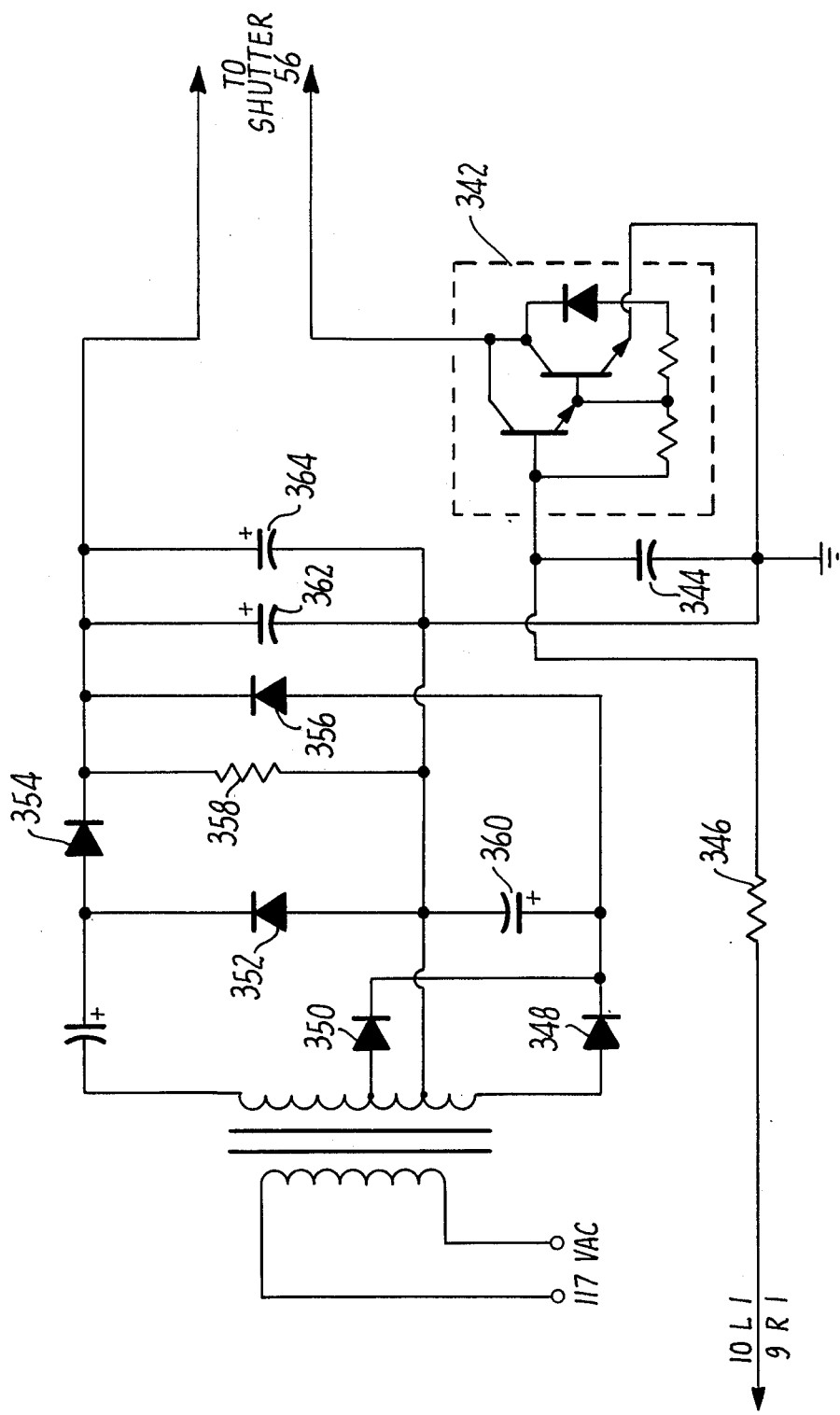
FIG. 10 is a schematic diagram of the drive circuit for driving the shutter of the multiple image camera of the preferred embodiment of the present invention as shown and described herein.

As will be evident from the above, then, the output signal at pin 10 of inverter 124 is a common exposure (or EXP) signal, which is produced each time the operator of the device of the preferred embodiment actuates the manual exposure switch 102 (FIG. 1) or depresses the exposure footswitch 104 (FIG. 1). In accordance with a particular feature of the present invention, this EXP signal is not immediately applied to the shutter-operating subcircuit (FIG. 10). Rather, this EXP signal is applied to an inhibiting network which prevents the transmission of the expose command to the shutter-operating subcircuit or shutter driver if one or more of certain predetermined operating conditions, such as "lens moving", "exposure in progress", or "out of film", i.e., every location on filmsheet 16 exposed, exists.

Referring again to FIG. 9, there is shown the exposure inhibiting circuit 128, comprising two JK Master/Slave flip-flops 130, 132 of a 7473-type integrated circuit; a NOR gate 134, which may be part of a 7402-type integrated circuit; and two NAND gates 138, 140, each of which may be part of a 7410-type integrated circuit; all interconnected as shown in FIG. 9. As there seen, the abovedescribed EXP signal is immitted to pin 5, the clock input pin, of JK flip-flop 130.

The circuit of the preferred embodiment of the present invention is divided into a plurality of subfigures, viz., FIGS. 7, 8, 9, and 10. Each link (i.e., interconnection having negligible impedance) extending between two circuit points located in different subfigures is specified herein by means of the following conventions:

1. From each of such circuit points there extends a lead which terminates adjacent an edge of the subfigure in which the point lies.

Example: The lead extending from pin 13 of integrated circuit 96 in FIG. 8 to the right-hand edge of FIG. 8.
2. Each subfigure is assumed to have four of such edges which together form a rectangle.
3. One of said four edges is arbitrarily designated the top (or T) edge, and the other three edges are then designated the right-hand (or R), bottom (or B), and left-hand (or L) edges, in clockwise order.
Example: The abovesaid lead extending from pin 13 of integrated circuit 96 in FIG. 8 extends to the right-hand edge (or R-edge) of FIG. 8. The edge of FIG. 8 opposite the R-edge is the L-edge, etc.
4. Any lead which terminates adjacent an edge of a subfigure is considered to be, and is called, a terminal thereof.
5. Each terminal of a figure of the drawings is uniquely identified by a code designation, called a home number, which may be easily deduced from the figure itself if not located immediately thereabove.
6. Each home number consists of three terms: the first term, the middle (or alphabetic) term, and the third term.
7. The alphabetic term of every home number at the T-edge of every subfigure is T. The alphabetic term of every home number at the R-edge of every subfigure is R. The alphabetic terms of the home numbers at the B and L edges are B and L, respectively.
8. Every home number in each subfigure has as its first term the number of that subfigure.
9. The third terms of the home numbers at any subfigure edge are identifying numerals assigned to the terminals at that edge. All along the R and L edges these identifying numerals increase in order from the T-edge toward the B-edge. Similarly, the identifying numerals (third terms) of the home numbers along the T and B edges increase in order from the L-edge toward the R-edge.
10. The home numbers of one or more other terminals will be found near certain terminals in the subfigures. These remote terminal home numbers are called remote numbers and serve to indicate the remote terminals to which adjacent terminal is linked, i.e., interconnected by an interconnection having negligible impedence. The expression "terminal number" is used when a term generic to both home numbers and remote numbers is required. Specifying more than one link to interconnect any pair of points does not imply that more than one such link is to be used in constructing an emodiment of the instant invention; the redundant links are specified merely for convenience in circuit tracing and not to indicate necessary structure.

As also seen in FIG. 9, a reset signal from NOR gate 134 is supplied to the reset terminals (pins 6 and 2) of both JK flip-flops 130 and 132. The input signal at pin 3 of NOR gate 134 is supplied by the coaction of NAND gates 138 and 140 as follows. The signals supplied to pins 1 and 2 of NAND gate 138 are provided by X-comparator 98 and Y-comparator 100, and jointly indicate the existence of the lens moving condition described hereinabove. The output signal produced at pin 12 of NAND gate 138 is of such potential level or logic level as to cause the exposure-inhibiting circuit 128 (via NOR gate 134) to suppress any exposure command inserted by the operator of the device of the invention during motion of the lens 11 from imaging location to imaging location with respect to film-sheet 16.

NAND gate 140 serves to provide a CR or "carriage return" signal when lens carriage 47 must be returned from its position corresponding to location 16-9 (FIG. 2) to its position corresponding to location 16-1, i.e., when filmsheet 16 must be replaced with a new and unexposed filmsheet 16 and the device of the preferred embodiment must be manually reset as explained hereinafter.

When this "reset required" condition occurs, and such a return motion of lens carriage 47 is required, the hereinafter described Y-position counter goes to its "unused" state, to which no image location on the filmsheet 16 corresponds, and the corresponding output signals (at terminals 8L1 and 8L2), applied to the input terminals of NAND gate 140, cause the output signal of NAND gate 140 (pin 8) to produce its CR-indicating signal.

The CR signal at the output of NAND gate 140, conditioned by the operation of gates 138 and 134, results in a corresponding signal on the input pins 2 and 6 of JK flip-flops 130 and 132, which, because of the well-known operating characteristics of the JK flip-flop, blocks expose commands from being passed forward to the shutter drive means by JK flip-flops 130 and 132.

Figure 2:
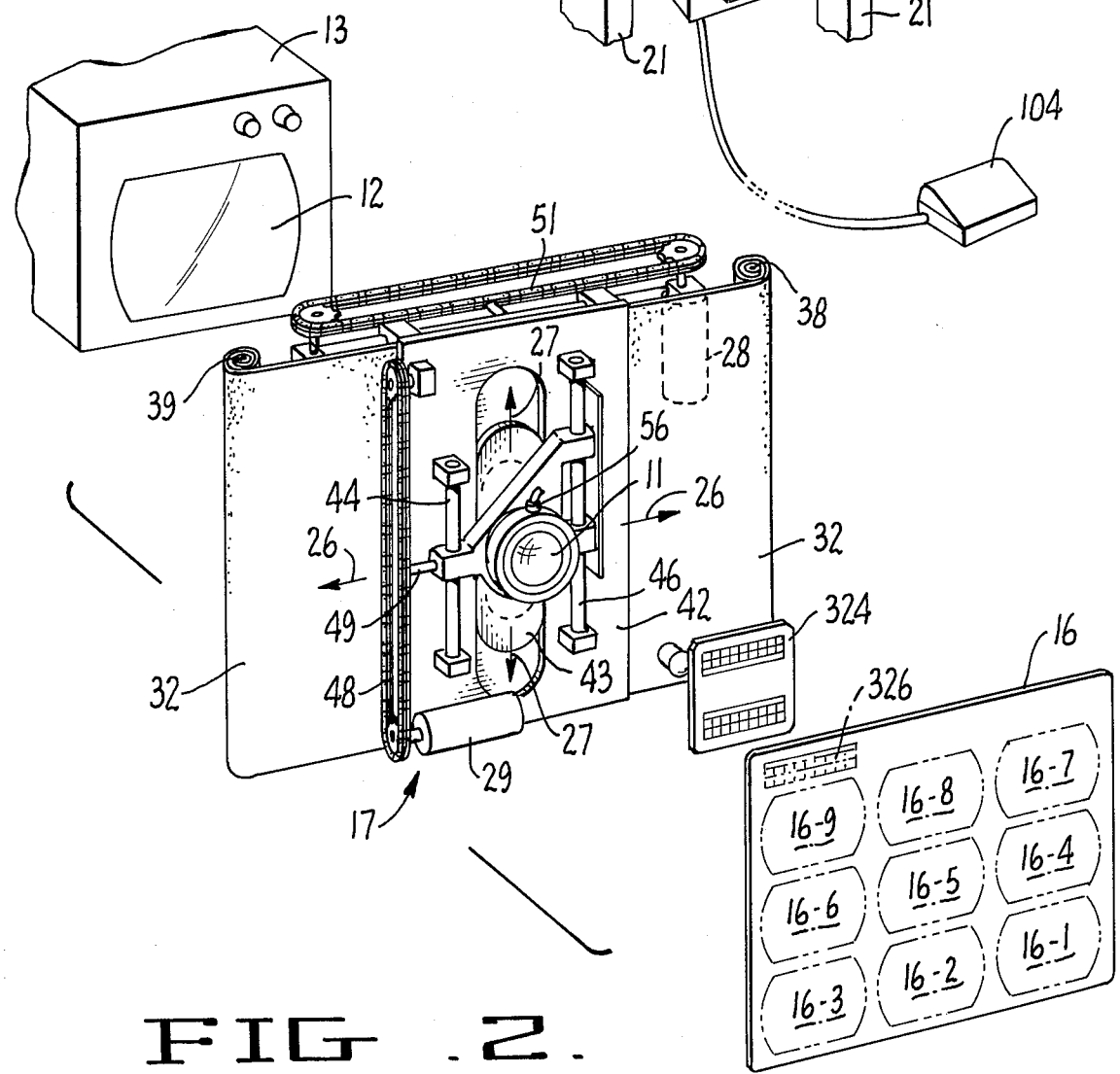
FIG. 2 is an enlarged fragmentary view of internal portions of the multiple image camera of FIG. 1, with the housing removed and sections broken away for clarity of illustration.

In addition, the occurrence of a CR signal at output pin 8 of NAND gate 140 also serves to prevent the operation of lens carriage drive motors 28 and 29 (FIG. 2). As seen in FIG. 8, the power circuit which supplies power to lens carriage drive motor 29 is controlled by signals passed through NAND gates 144 and 146, and the power circuit which supplies power to lens carriage drive motor 28 is controlled by signals passed through NAND gates 148 and 150. As also seen in FIG. 8, one input terminal of each of these four gates is connected to terminal 9B3 which is the output terminal of NAND gate 140. Thus, the CR signal at the output terminal of NAND gate 140 is enabled to prevent the operation of either lens carriage drive motor, and since the CR signal is produced when the 16-9 location on film-strip 16 has been exposed, and the Y-position counter goes forward to its unused state, it follows that the lens carriage drive motors are disenabled by means of the CR signal from gate 140 acting on gates 144, 146, 148, and 150 (FIG. 8) after the ninth exposure on any filmstrip 16.

As also seen in FIG. 9, the CR output signal of gate 140 is also used to operate on "exposure completed" warning device, such as a device of the kind sold under the trademark SONALERT. The warning device drive circuit shown in FIG. 9 connected to the output terminal of gates 140 may typically comprise an integrated circuit timer 152, such as an NE555 timer of the kind manufactured by the Signetics Corporation. In this warning device drive circuit capacitor 154 may be a 0.01 microfarad capacitor, resistor 156 may be a 20,000 ohm resistor, capacitor 28 may be a 1 microfarad capacitor, and resistor 160 may be a 1 megohm resistor. This warning device drive circuit serves to energize the SONALERT and thus produce an audible warning signal for a predetermined interval after the ninth and last exposure on each filmsheet 16 is made.

Also shown in FIG. 9 are the two alternative exposure timing means of the preferred embodiment. The first, or internal, exposure timing means of the preferred embodiment comprises an NE555 integrated circuit timer 164 interconnected with exposure-inhibiting circuit 128 for initiation of each timing cycle in a manner which will be apparent to those having ordinary skill in the art from review of FIG. 9. In this internal exposure timing circuit capacitor 166 may have a capacitance of 1 microfarad, resistor 168 may have a resistance of 20,000 ohms, and capacitor 170 may have a capacitance of 0.01 microfarads. The exposure duration provided by said internal timing circuit may be selected by the operator of the device of the preferred embodiment by manipulation of ganged switch 172, having a first deck 172A and a second deck 172B. In this internal timing circuit the resistors 174, 176, 178, 180, and 182 may have resistance values of 887 ohms, 442 ohms, 221 ohms, 110 ohms, and 110 ohms respectively.

The second, or video, exposure timing means shown in FIG. 9 comprises two 7493-type four-bit binary counters 186 and 188. Counters 186 and 188 are driven by video synchronization signals produced on terminal 9B4 by means of a SYNC SEPARATOR circuit of one of the well-known kinds (not shown). The purpose of this internal video exposure timing circuit is to synchronize the opening and closing of shutter 56 (FIG. 2) with the beginning and ending of complete display rasters on the screen 12 of monitor 13. Thus, the frame synchronization signals are stripped from the input signal to monitor 13 in the well-known manner by the abovesaid SYNC SEPARATOR, and the frame synchronization signals thus stripped are employed to drive counters 186 and 188. The desired exposure duration is set by the operator of the preferred embodiment in the internal video timing mode by a manipulating switch 172 until the movable contact is engaged with the fixed contact of deck 172B corresponding most closely to the desired exposure setting.

Selection as between internal timing operation and synchronized video timing operation is made by the operator of the device of the preferred embodiment by manipulation of ganged switches 190 and 192. Switch 190 is so connected with the shutter drive circuit of FIG. 10, by way of interconnection 9R1, as to hold shutter 56 open during such time as a suitable signal is supplied to the moving contact of switch 190. Switch 190 is also connected to supply "shutter open" signals to inverters 194, 196, and 198 (FIG. 9) for reasons which will be set forth hereinafter. The RC-network associated with inverter 194 may comprise a 270 ohm resistor 200 and a 0.01 microfarad capacitor 204.

In the INTERNAL position of ganged switches 190 and 192 integrated circuit timer 164 operates in the well-known manner to establish the exposure duration set on switch 172, the duration of the output "pedestal" signal at pin 3 of timer 164 commencing when the exposure-inhibiting circuit 128 passes an exposure start signal from switch 102 or 104 to timer 164, and ending, in the well-known manner, when the delay interval preset by manual manipulation of switch 172 has elapsed. As will be seen from FIG. 9, this "pedestal" is passed to terminal 9R1, and thence to terminal 10L1 of the shutter drive circuit of FIG. 10 via switch 190. At the same time, switch 190 also passes this pedestal signal to the input terminals of inverters 194, 196, and 198 for purposes to be set forth hereinafter.

As may also be seen in FIG. 9, when ganged switches 190, 192 are set in their INTERNAL condition, a signal from inverter 194, conditioned by RC-network 200, 204 is applied to input pin 2 of NOR gate 134, and thus terminates the blocking of EXP signals resulting from inadvertent operation of the exposure switches 102 and 104 are blocked by exposure-inhibiting circuit 128 during the open time of shutter 56.

As may further be seen from FIG. 9, the pedestal timing signal supplied to the shutter driver circuit of FIG. 10 through terminal 9R1 and switch 190 during VIDEO operation of the device of the preferred embodiment is derived from the Q terminal of JK flip-flop 132, which terminal is brought to its pedestal state by an EXP signal initiated by one of the exposure switches 102, 104, followed by the next frame synchronization signal at terminal 9B4. This terminal of JK flip-flop 132 remains in its pedestal state due to the well-known action of flip-flop circuits until it receives a reset signal when the terminal of counter 186 contacted by the moving contact of switch 172 changes state due to the associated counter of counter 188, 186 being reached.

Returning now to FIG. 8, the X-position counter 210 and the Y-position counter 216 will first be discussed, it being recalled from the discussion above that these counters supply the NCPX and NCPY signal sets to the X-comparator 98 and Y-comparator 100, respectively.

X-position counter 210 comprises two D-type flip-flops, 220 and 222, which may be the two flip-flops of a 7474-type integrated circuit; and an integrated circuit monostable multivibrator 224 of the 74121-type.

Y-position counter 216 comprises two D-type flip-flops, 230 and 232, which may be the two flip-flops of a 7474-type integrated circuit.

As will be apparent to those of ordinary skill in the art who study the present disclosure, counters 210 and 216 are intercoupled by signal line 236 to constitute what is essentially a single counter chain or counter. This counter chain or counter will hereinafter be called the "new lens carriage position counter chain" or simply the "position counter", and will be referred to by the reference numeral 240. The NCPX signal set is supplied to X-comparator 98 by means of leads 242 and 244; and the NCPY signal set is supplied to Y-comparator 100 by means of leads 246 and 248.

As will be apparent to those having ordinary skill in the art, position counter 240 is advanced step-by-step by signals received at pin 3 of D-type flip-flop 22. Pin 3, however, is directly connected to terminal 9B6, which is itself connected to output pin 2 of inverter 198, FIG. 9. As explained above, the pedestal signal which controls the operation of shutter 56 is supplied to input pin 1 of inverter 198 (FIG. 9), and thus the signal at output pin 2 of inverter 198, which is applied to the count input (pin 3) of flip-flop 222, will have the same rise and fall times as the abovesaid exposure timing pedestal signal. Thus it will be seen by those having ordinary skill in the art, informed by the present disclosure, that position counter 240 is advanced each time shutter 56 is opened to expose one of the image locations 16-1 on filmsheet 16.

Referring again to FIG. 8, it will now be understood that whenever position counter 240 is advanced from one of its operating states to the next at the end of an exposure time as determined by said pedestal signal, the NCPX and NCPY signal sets supplied by it to the comparators 98 and 100 are no longer equivalent to the ACPX and ACPY signal sets supplied to comparators 98 and 100 by the X and Y code converters (integrated circuit 96). When this condition occurs error signals are produced by one or both of the comparators 98 and 100 at their output pins 5 and 7. As may be seen from FIG. 8, these error signals are supplied to the input terminals of gates 144, 146, 148, and 150, or some of them, producing output signals at the output terminals of at least some of these gates unless inhibiting signals are then being supplied from terminal 9B3 to the lower input terminals of these gates as seen in FIG. 8.

As may also be seen in FIG. 8, each of the gates 144, 146, 148, 150 has associated with it an output circuit comprising a power package 250, 252, 254, 256 of the type known by the art-recognized designation 2N6056, and an intermediate transistor amplifier 260, 262, 264, 266. The power packages 254 and 256 are connected between a 6-volt positive supply point 270 and a 6-volt negative supply point 272, and their common point 274 is connected to terminal 8R8 which is itself connected to drive motor 28 (FIG. 2). Thus, the power packages 254 and 256 are arranged to supply operating current to the X-direction drive motor 28 of the device of the preferred embodiment. The polarity of the current supplied to the drive motor 28 is determined by signals received from gates 148 and 150, and thus the direction of rotation of drive motor 28 and the corresponding sense of horizontal movement of lens carriage 47 are determined by the output signals from gates 148 and 150. The resistors 276 and 278 of intermediate amplifier 266 may be 1,000 ohm resistors, and the transistor 280 of that intermediate amplifier may be a 2N3638 transistor. The resistors 282 and 284 of intermediate amplifier 264 may be 1,000 ohm resistors, and the transistor 286 of that intermediate amplifier may be a 2N3638 transistor.

Comparing the output circuits associated with gates 144 and 146 with the output circuits associated with gates 148 and 150, and noting that the common point 290 between the power packages 250 and 252 is connected to drive motor 29, the Y-direction drive motor, it will be seen by those having ordinary skill in the art that the output circuits associated with gates 144 and 146 serve to control the Y-direction motor 29 just as the substantially identical circuits associated with the outputs of gates 148 and 150 control the operation of X-direction drive motor 28. Thus, it will be seen that the signals at the output terminals of gates 144 and 146 control the Y-motion of lens carriage 47, and the signals at the output terminals of gates 148 and 150 control the X-motion of lens carriage 47. The resistors 292 and 294 of intermediate amplifier 262 may be 1,000 ohm resistors, and the transistor 296 of intermediate amplifier 262 may be a 2N2628 transistor. In intermediate amplifier 260 the resistors 300 and 302 may be 1,000 ohm resistors, and transistor 304 may be a 2N3638 transistor.

Summarizing the above, the lens carriage drive motors 28 and 29 are operated by suitable currents from power packages 254, 256, 250, and 252, under the control of the gates 144, 146, 148, and 150, to reposition lens carriage 47, and thus lens 11, whenever position counter 240 is advanced at the completion of an exposure. The circuit and mechanical structure of the device of the preferred embodiment is so constructed and arranged, as shown and described herein, that the drive motors reposition the lens carriage 47 at the location corresponding to the new (post-exposure) state of position counter 240, whereby the position signals supplied to the comparators 98 and 100 again match the position signals supplied to comparators 98 and 100 by position counter 240, no error signals are emitted by either comparator, and thus the lens carriage 47 remains in the position indicated by the state of position counter 240 until the end of the next exposure, when position counter 240 is again advanced to its next state, and in response thereto the drive motors, or one of the drive motors, move lens carriage 47 to the position corresponding to the new state of position counter 240.

Also shown in FIG. 8 is the circuit whereby the device of the preferred embodiment is reset to commence the exposure of a full set of image locations on a new filmsheet 16 after all image locations on the previous filmsheet 16 have been exposed. This reset circuit comprises reset switch 310, NOR gate 312, inverter 314, capacitors 316 and 318, and resistor 320. As indicated, reset switch 310 is of the well-known push-to-close variety, and serves when closed to connect RC-network 318, 320 to a 5-volt positive direct current source. NOR gate 312 may be one of the gates of a 7402-type integrated circuit. Inverter 314 may be one of the inverters of a 7404-type integrated circuit. Capacitor 316 may be a 0.01 microfarad capacitor, and capacitor 318 may be a 0.1 microfarad capacitor. Resistor 320 may be a 270 ohm resistor. As will be apparent to those having odinary skill in the art, the interconnections between the reset circuit and position counter 240 are such that upon depression and closing of reset switch 310, and its subsequent release, position counter 240 is driven to assume its state which corresponds to the location of lens 11 for imaging the display on screen 12 (FIG. 2) on location 16-1 of filmsheet 16 (FIG. 2). This change in the state of position counter 240 results in error signals from comparators 98 and 100, which error signals bring about the return of lens carriage 47 to the corresponding position, thus terminating said error signals and preparing the device of the preferred embodiment for exposure of area 16-1 upon depression by the operator of one of the two exposure switches 102, 104 (FIG. 9).

Also shown in FIG. 8 is a circuit for energizing the data card exposure lamp 322 (FIG. 3), and thus imaging the data on data card 324 (FIG. 3), on filmsheet 16 at location 326 (FIG. 2). As is evident from FIG. 8, and its just described operation, the imaging of the related data section of card 324 on filmstrip 16, whereby the data is reproduced at location 326, takes place when the device of the preferred embodiment is reset. Thus, the related data card 324 must be left in its receiving slot 328 until resetting is complete or substantially complete, and then removed from the device of the preferred embodiment along with the cassette containing filmstrip 16.

As seen in FIG. 8, the driver circuit for energizing lamp 322 principally comprises an integrated circuit 330 and a transistor 332. Integrated circuit 330 may be a Signetics NE555 timer, and transistor 332 may be a 2N5490 transistor. Resistor 334 may be a 100 ohm resistor, and resistor 336 may be a 20,000 ohm resistor. Capacitor 338 may be a 1 microfarad capacitor, and resistor 340 may be a 1 megohm resistor.

Going now to FIG. 10, there is shown a driver circuit suitable for driving shutter 56, the principles of such circits being well known to those having ordinary skill in the art. In the circuit of FIG. 10 power package circuit 342 may, for instance, be of the 2N6056 type. Capacitor 344 may be a 0.1 microfarad capacitor, and resistor 346 may be a 2,000 ohm resistor. Diodes 348 and 350 may be 1N4001 diodes, and diodes 352, 354, and 356 may be 1N4003 diodes. Resistor 358 may be a 100,000 ohm resistor. The selection of suitable values for the electrolytic capacitors 360, 362, and 364 of the shutter drive circuit of FIG. 10 is within the scope of those having ordinary skill in the art. It may also be found desirable to provide an LED numerical indicator and associated encoding circuit for notifying the operator of the location on filmsheet 16 next to be exposed, and the provision of such is within the scope of one having ordinary skill in the art without exercising invention.

It will thus be seen that the objects set forth above, among those made apparent from the preceding description, are efficiently attained, and since certain changes may be made in the above construction without departing from the scope of the invention it is intended that all matter contained in the above description or shown in the accompanying drawings shall be interpreted as illustrative only and not in a limiting sense.

It is also to be understood that the following claims are intended to cover all of the generic and specific features of the invention herein described, and all statements of the scope of the invention which as a matter of language might be said to fall therebetween.

What is claimed is:

1. Apparatus for receiving video output from a patient scanning device and photographing a plurality of video displays onto a sheet of film, comprising:
    a video monitor adapted for connection to the scanning device and having a display tube;
    a sheet film holder mounted in spaced relation to said display tube;
    a wide angle lens mounted between said display tube and said film holder for projecting a minified image of the face of said display tube onto sheet film in said holder with the positioning of such image on the film being determined by the positioning of said lens with respect to said film;
    a shutter associated with said lens for controlling passage of light therethrough;
    manually operable shutter actuating means;
    automtic means responsive to each operation of said shutter actuating means for repositioning said lens in the next one of a predetermined sequence of predetermined lens locations until each one of a corresponding plurality of image aeas on a sheet of film in said film holder is exposed; and
    housing means formed for maintaining light-tight integrity between said lens and said film holder.

2. An apparatus as claimed in claim 1 and wherein said housing means comprises a light tight case providing walls enclosing said video monitor and said lens, with said film holder being located in one wall of said case for access without opening said case.

3. An apparatus as claimed in claim 2 and wherein manually operable flexible shaft control elements penetrate said case and are operatively connected to the brightness and contrast controls of said video monitor.

4. An apparatus as claimed in claim 2 and wherein said shutter is provided with time exposure control, and operating means is provided for said exposure control, said operating means having a manually operable element mounted outside said case.

5. An apparatus as claimed in claim 1 and said housing means being formed with a laterally movable portion, and said portion having a transversely movable section supporting said lens.

6. An apparatus as claimed in claim 5 and wherein said lateraly movable portion comprises a flexible curtain slidable in grooves formed in a partition provided in said housing means.

7. An apparatus as claimed in claim 6 and wherein said curtain is formed with a cut out area, and said section comprises overlapping plates slidable on each other and secured to said lens and said cut out area of said curtain, said section being dimensioned to fill said cut out area completely at all positions of said lens.

8. An apparatus as claimed in claim 7 and wherein said means for repositioning said lens laterally comprises a reversible electric motor mounted on said housing means and having a driven member operatively connected to said laterally movable portion, and automatic control means for starting and stopping and reversing said electric motor so as to selectively position said lens at desired lateral locations.

9. An apparatus as claimed in claim 8 and wherein said means for repositioning said lens transversely of said movable portion comprises a second reversible electric motor mounted on said movable portion, a drive element formed for actuation by said second motor and operatively connected to said lens for effecting transverse movement thereof, and second control means for starting and stopping and reversing said second motor so as to selectively position said lens at desired transverse locations.

10. An apparatus as claimed in claim 1 and wherein the film is 8 × 10 inch x-ray cut filmsheets, and said apparatus is formed to project said images of said video display tube face onto said film with the longer axes of each image extending parallel to the longer axes of the film.

11. Apparatus as claimed in claim 1, in which said repositioning means comprises first and second photoelectric position signal generating means for producing first and second position signals representing the one of said locations in which said lens is actually positioned, and further comprising code conversion means for converting said first and second position signals from a first binary code to a second binary code, a position counter capable of serially assuming a sequence of states corresponding to a predetermined series of desired lens locations and in each state producing a set of signals identified with the corresponding desired lens location, and comparator means for comparing said position signals with said signals identified with said corresponding desired lens locations and producing signals to initiate movement at said lens when its input signals do not match.

12. Apparatus for photographing a plurality of displays onto a sheet of film, comprising:
    a lens adapted to receive light from a display tube;
    holder means for holding a sheet of film a spaced distance from said lens; and
    positioning means for moving said lens relative to said holder means to a plurality of desired positions whereat said lens projects an image of the display on said display tube onto the film in a plurality of corresponding positions, said positioning means comprising first and second photoelectric position signal generating means for producing first and second position signals representing the actual position of said lens in a first coordinate direction and a second coordinate direction, and further comprising code conversion means for converting said first and second position signals from a first binary code to a second binary code, a position counter capable of serially assuming a sequence of states corresponding to a predetermined series of said desired positions and in each state producing a set of signals identified with the corresponding desired position, and comparator means for comparing said position signals with said signals identified with said corresponding desired positions and producing signals to initiate movement of said lens when its input signals do not match.

13. Apparatus for photographing a plurality of displays onto a sheet of film, comprising:
a lens adapted to receive light from a display tube;
holder means for holding a sheet of film a spaced distance from said lens; and
positioning means for moving said lens relative to said holder means to a plurality of desired positions whereat said lens projects an image of the display on said display tube onto the film in a plurality of corresponding positions, said positioning means comprising first and second photoelectric position signal generating means for producing first and second position signals representing the actual position of said lens in a first coordinate direction and a second coordinate direction.

14. Apparatus as claimed in claim 13, further comprising code conversion means for converting said first and second position signals from a first binary code to a second binary code.

15. Apparatus for photographing a plurality of displays onto a sheet of film, comprising:
a lens adapted to receive light from a display tube;
holder means for holding a sheet of film a spaced distance from said lens;
positioning means for moving said lens relative to said holder means to a plurality of desired positions whereat said lens projects an image of the display on said display tube onto the film in a plurality of corresponding positions; and
a position counter capable of serially assuming a sequence of states corresponding to a predetermined series of desired positions and in each state producing a set of signals identified with the corresponding desired position.

16. Apparatus as claimed in claim 15 in which said position counter, afte having progressed through said sequence of states, assumes a unique state corresponding to none of said desired positions.

17. Apparatus as claimed in claim 16 in which said position counter assumes said unique state after said lens has progressed through said predetermined series of desired positions.

18. Apparatus as claimed in claim 17, further comprising manually operable means for resetting said position counter from said unique state to the first one of said sequence of states and thus causing said positioning means to move said lens from the last position of said predetermined series of desired positions to the first position of said predetermined series of desired positions.

19. Apparatus as claimed in claim 18, further comprising control means for causing said position counter to progress seriatim from each of the states of said sequence of states to the next.

20. Apparatus as claimed in claim 19 in which said control means includes manually operable control means mounted on said apparatus.

21. Apparatus as claimed in claim 19 in which said control means includes foot-operated remote control means.

22. Apparatus for receiving video output from a patient scanning device and photographing a plurality of video displays onto a sheet of film, comprising:
a video monitor adapted for connection to the scanning device and having a display tube;
a sheet film holder mounted in spaced reltation to said display tube;
a wide angle lens mounted between said display tube and said film holder for projecting an image of the face of said display tube onto film in said holder with the positioning of such image on the film being determined by the positioning of said lens with respect to said film;
a shutter associated with said lens for controlling passage of light therethrough;
means for selectively positioning said lens in a plurality of locations spaced vertically and laterally with respect to said film so as to project sequential images of said display tube onto said sheet of film at a plurality of vertically and laterally spaced positions; and
housing means for maintaining light-tight integrity between said lens and said film holder, said posiitoning means comprising first and second photoelectric position signal generating means for producing first and second position signals representing the one of said locations in which said lens is actually positioned.

23. Apparatus as claimed in claim 22, further comprising code conversion means for converting said first and second position signals from a first binary code to a second binary code.

24. Apparatus for receiving video output from a patient scanning device and photographing a plurality of video displays onto a sheet of film, comprising:
a video monitor adapted for connection to the scanning device and having a display tube;
a sheet film holder mounted in spaced relation to said display tube;
a wide angle lens mounted between said display tube and said film holder for projecting an image of the face of said display tube onto film in said holder with the positioning of such image on the film being determined by the positioning of said lens with respect to said film;
a shutter associated with said lens for controlling passage of light therethrough;
means for selectively positioning said lens in a plurality of locations spaced vertically and laterally with respect to said film so as to project sequential images of said display tube onto said sheet of film at a plurality of vertically and laterally spaced positions;
housing means formed for maintaining light-tight integrity between said lens and said film holder; and
a position counter capable of serially assuming a sequence of states corresponding to a predetermined series of desired lens locations and in each state producing a set of signals identified with the corresponding desired lens location.

25. Apparatus as claimed in claim 24 in which said position counter, after having progressed through said sequence of states, assumes a unique state corresponding to none of said desired lens locations.

26. Apparatus as claimed in claim 25 in which said position counter assumes said unique state after said lens has progressed through said predetermined series of desired lens locations.

27. Apparatus as claimed in claim 26, further comprising manually operable means for resetting said position counter from said unique state to the fist one of said sequence of states and thus causing said positioning means to move said lens from the last of said predetermined series of desired lens locations to the first of said predetermined series of desired lens locations.

28. Apparatus as claimed in claim 27, further comprising control means for causing said position counter to progress seriatim from each of the states of said sequence of states to the next.

29. Apparatus as claimed in claim 28 in which said control means includes manually operable control means mounted on said apparatus.

30. Apparatus as claimed in claim 28 in which said control means includes foot-operated remote control means.

\* \* \* \* \*